June 1, 1965    C. F. PABST ETAL    3,186,267
LATHE
Original Filed June 14, 1962    7 Sheets-Sheet 2

Fig. 2.

INVENTORS
Carl F. Pabst
Paul Neumann
BY
Synnestvedt & Lechner
ATTORNEYS

United States Patent Office 3,186,267
Patented June 1, 1965

3,186,267
LATHE
Carl F. Pabst and Paul Neumann, Cincinnati, Ohio, assignors to The Lodge & Shipley Company, Cincinnati, Ohio, a corporation of Ohio
Continuation of application Ser. No. 202,438, June 14, 1962. This application June 10, 1964, Ser. No. 375,973
10 Claims. (Cl. 82—2)

This application is a continuation of our copending application Serial No. 202,438, filed June 14, 1962, and now abandoned.

This invention relates to lathes and in particular relates to lathe structure especially adapted for use in supporting a tool or tools whose operation is automatically programmed or controlled by information taken from punched or magnetic tape.

A lathe having controls of the kind mentioned is commonly referred to as a numerically controlled lathe. Such lathes find especial utility in those situations where fabrication of a part requires a large number of different operations such as boring, facing, turning or contouring and especially where there are a relatively large number of parts all to be machined in the same way. In such instances the numerically controlled lathe has a plurality of tools which are sequentially brought into play and then moved along a desired path for each machining operation.

To provide the correct programming and control information to the lathe, the electro-mechanical equipment is necessarily of high physical and operational quality. Such equipment, particularly the continuous path type, is relatively expensive usually costing much more than the lathe itself. In this context then it is of utmost importance that the lathe per se be error free or capable of performance which is consistent with the accuracy and reliability of its control equipment.

There are two principal areas which may cause faulty performance of the lathe. One of these is in design; i.e., faulty design of carriage, bed or cross slide so that by distortion or deflection of one of these components, the tool does not follow the desired path, or faulty design permitting cocking or fishtailing of the carriage or cross slide. Another significant source of error is due to chips. For example, those of fragmental size fouling the carriage and cross slide ways or fouling the carriage feed and cross slide screws and larger chips accumulating on the bed, carriage or cross slide and causing heat distortion.

Chip disposal, that is to say, preventing accumulations and keeping chips away from sliding or moving surfaces becomes aggravated in those instances where a coolant is used during the cutting operaton. This is so because the coolant, being a relatively viscous liquid, is prone to spatter and very often carries the smaller chips and chip dust into those areas where their presence is highly undesirable.

The principal purpose of the present invention is to provide a numerically controlled lathe structure arranged to be relatively free of distortion and deflection and to support the carriage and cross slide for movement without cocking, while at the same time being arranged to isolate chips, chip dust and coolant from the various sliding and moving surfaces.

A preferred embodiment of the invention and various of the features thereof will be apparent from the following description and drawings wherein.

Figure 1:
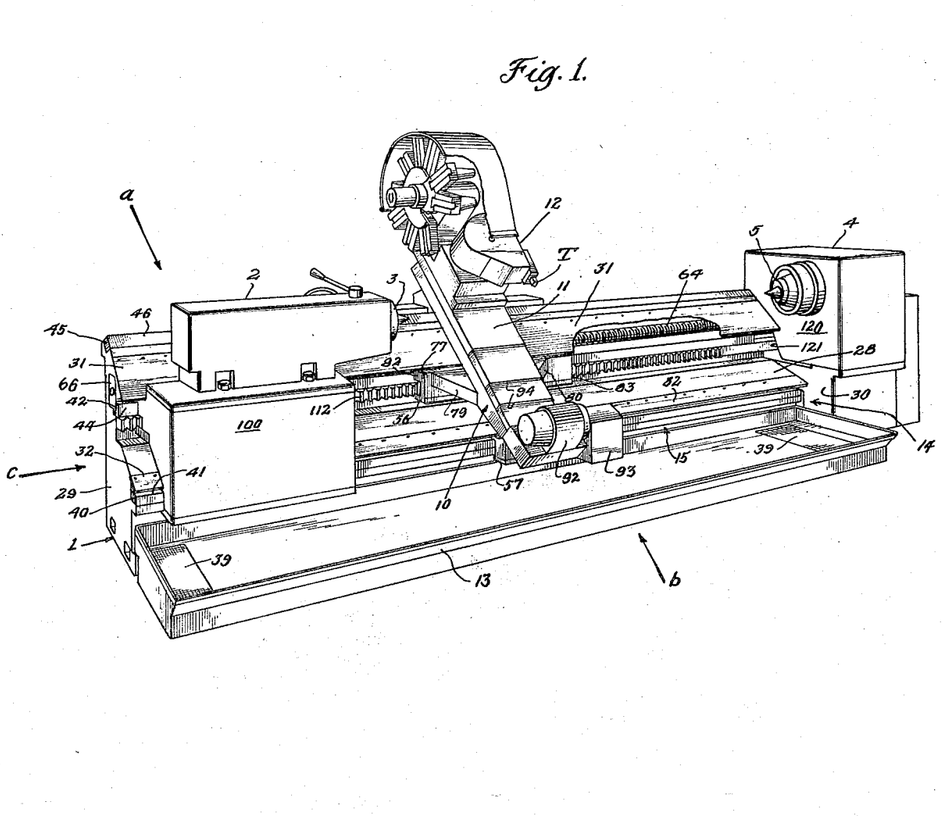
FIGURE 1 is a perspective view of a lathe constructed in accordance with the invention, the view is taken looking at the rear or back of the lathe, the headstock being on the right, the tailstock on the left and the carriage located between the two.
Figure 2:
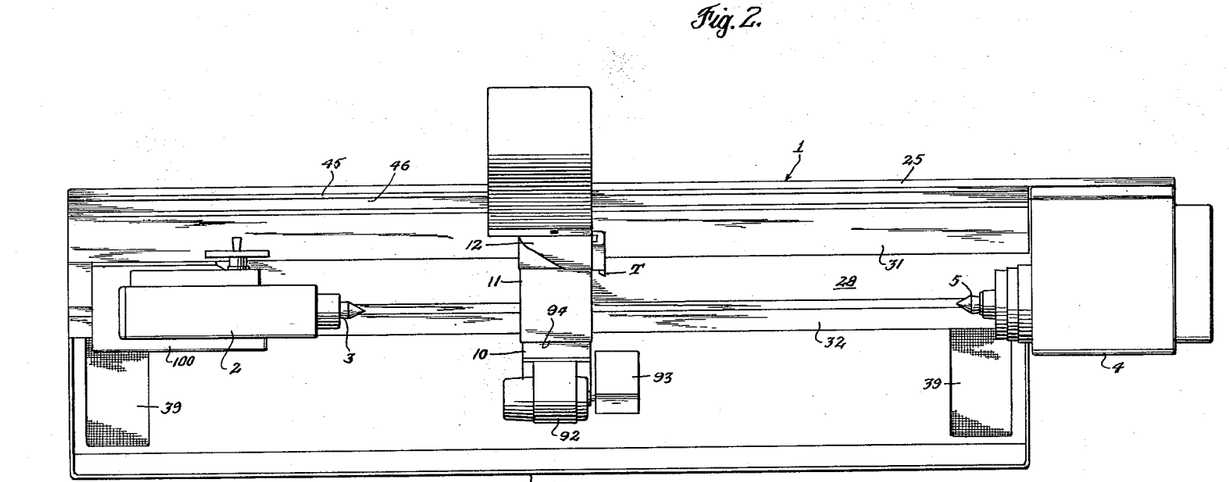
FIGURE 2 is a plan view of the lathe of FIGURE 1.
Figure 3:
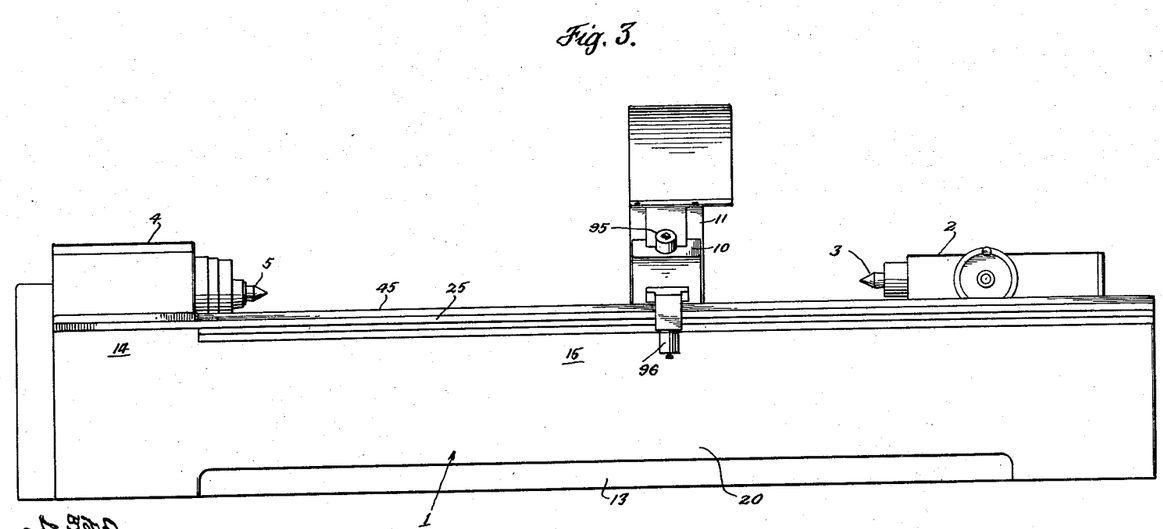
FIGURE 3 is a view of the front of the lathe of FIGURE 1 being taken in a direction indicated by the arrow *a* in FIGURE 1, the headstock is on the left and the tailstock on the right.

Referring to FIGURE 1, the numeral 1 represents a bed structure which is generally elongated and extends in a horizontal direction. Note that the top of the bed slopes in a direction from the front to the back. A tailstock 2 is slidably mounted on the bed and adjustable to a position on the bed commensurate with the length of the workpiece to be machined. The tailstock carries a spindle 3 whose rotational axis extends in a horizontal direction. A headstock 4 is fixed to one end of the bed and carries a rotatable chuck spindle 5, the rotational axis of which is co-axial with the axis of the tailstock. A carriage, generally indicated by the numeral 10, is mounted on the bed for back and forth movement between the tailstock and headstock. It will be observed that the carriage is oriented so that it slopes in a direction from the front to the back. The carriage supports a 90° cross slide 11. The carriage mounts the cross slide so that its 90° motion is along a path sloping from front to back. The cross slide 11 carries tool changing and supporting apparatus 12. Disposed along the bottom of the back of the lathe is a chip pan 13.

The apparatus 12 has means for storing a plurality of different kinds or types of tools and for bringing any preselected tool from a storage position to a working position wherein the tool is ready for operating on the workpiece. The details of construction of the apparatus 12 are disclosed in copending application of William C. E. Coate, Serial No. 143,076, filed October 5, 1961.

One of the features of the invention is the provision for disposing of chips and/or coolant to prevent accumulations of hot chips and to keep the bed ways and carriage feed mechanism free from contamination. The general nature of the means for accomplishing this objective will be apparent from an inspection of FIGURE 1 where it will be seen that the top part of the bed has a structure which slopes from the front towards the back. This sloping structure is in the nature of a slide or inclined plane oriented so that chips and/or a mixture of chips and coolant, falling on the same during a cutting operation, will be caused by gravity to move downwardly and into the chip pan 13. The carriage and its cross slide are also oriented so as to partake of this slope so that any chips or coolant falling on the top of the cross slide will also tend to move downwardly towards the chip pan.

The manner in which the bed is constructed so as to provide this slide or inclined plane effect will be described below.

Figure 5:
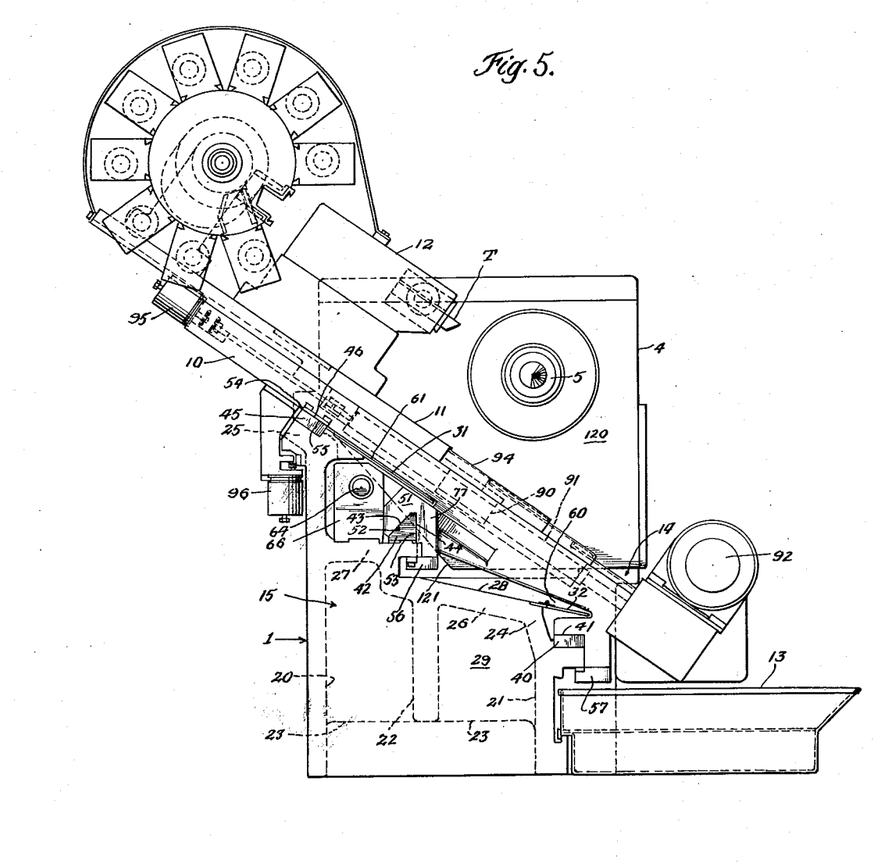
FIGURE 5 is an end elevational view of the lathe of FIGURE 1 with the tailstock removed, the view being taken in a direction indicated by the arrow *c* in FIGURE 1 and showing carriage, cross slide, headstock and chip pan.
Figures 6, 7:
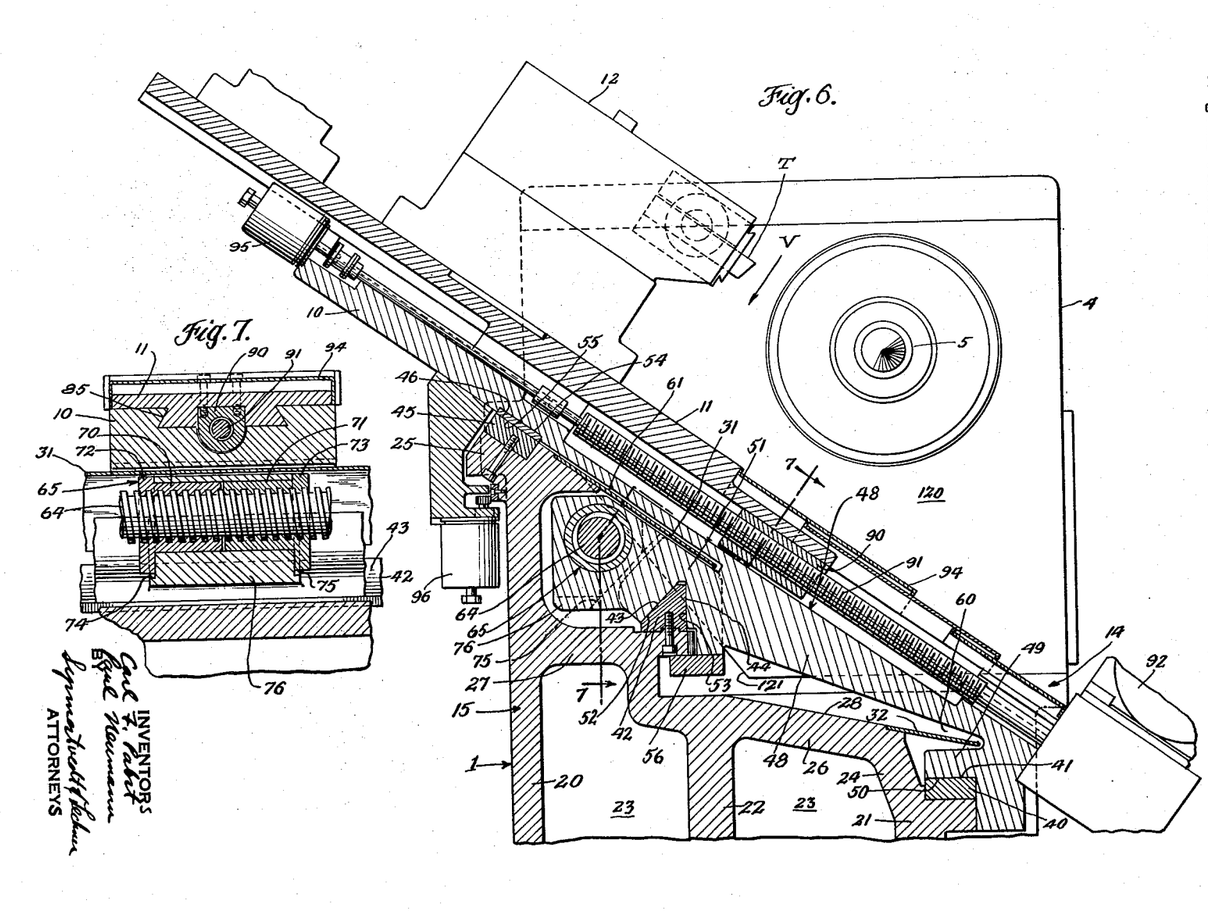
FIGURE 6 is an enlarged cross sectional view taken approximately on the lines 6—6 of FIGURE 4 showing bed, carriage and cross slide structure.
FIGURE 7 is a cross section taken on the line 7—7 of FIGURE 6 showing the carriage feed screw and its operating nut.

With reference to FIGURE 1, the bed has a section 14 (supporting the headstock) and a section 15 (supporting the carriage and tailstock). Referring to FIGURES 5 and 6, the section 15 comprises a front 20, a back 21, an intermediate member 22. Between the intermediate member 22 and the front and back are transverse web members 23. It will be observed that the top 24 of the back is at a lower elevation than the top 25 of the front. Between the intermediate member 22 and the back and front are the bridges 26 and 27. The bridge 26 has a flat surface 28 which slopes in a direction from the front to the back.

The front 20, the intermediate member 22 and the bridge 27 all extend from an end plate 29 (FIGURE 1) to a corresponding end plate on the opposite side of the lathe. The extension of the intermediate member 22 beyond the section 15 forms the inner vertical wall of the structure making up the bed section 14. The back 21 and the bridge 26 extend from the end plate 29 to the transverse vertical wall 30 of the bed section 14.

Figures 8, 9:
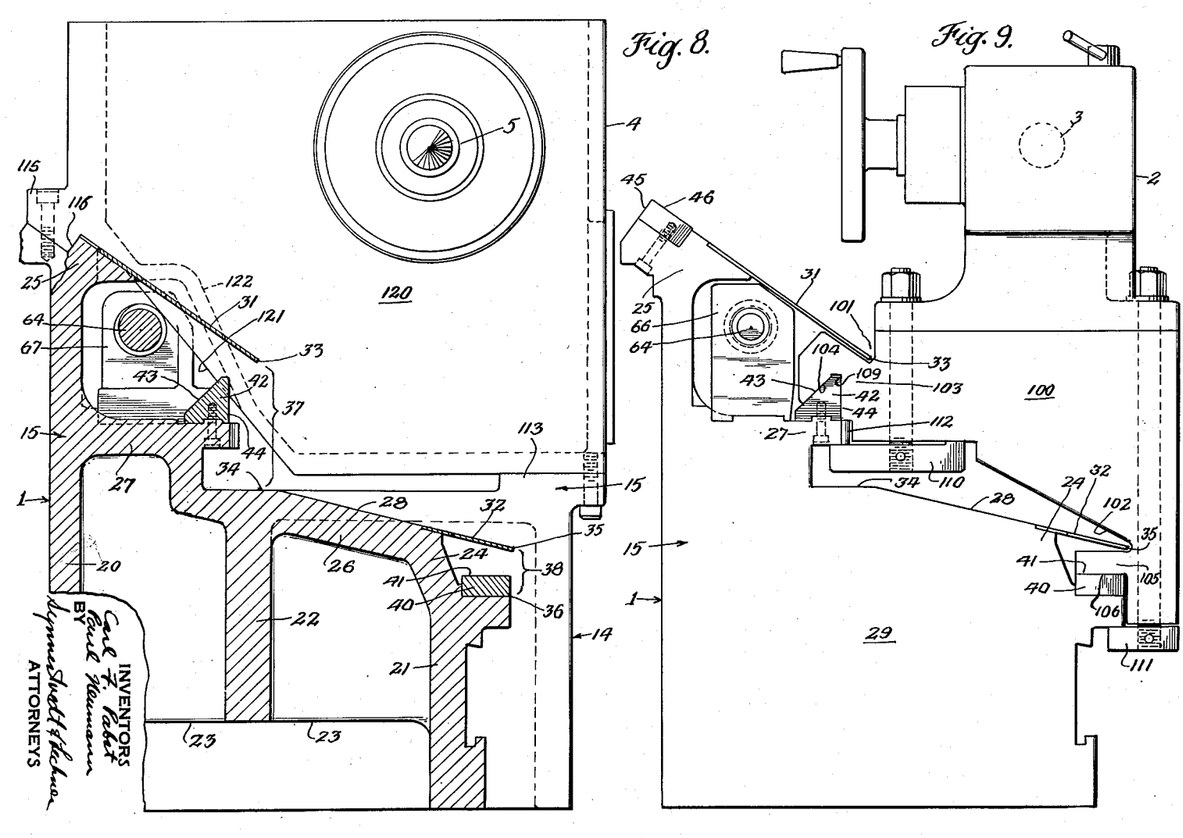
FIGURE 8 is a cross section taken on the line 8—8 of FIGURE 4 showing bed and headstock structure.
FIGURE 9 is an end view of the lathe of FIGURE 1 taken in the direction indicated by the arrow *c* in FIGURE 1 but with the tailstock mounted on the bed and the carriage and headstock removed.

As best indicated in FIGURE 8, a chip guard 31 is connected to the top 25 of the front and a chip guard 32 is connected to the top 24 of the back. The chip guards 31 and 32 extend the full length of the section 15 of the lathe terminating on the right hand side (FIG. 1) at the headstock.

The chip guard 31, the surface 28 and the chip guard 32 constitute means forming a slide which has a slope extending from the front to the back. If an object were placed on the topmost part of the guard 31, gravity would tend to make the object move down across the guard 31 and thence dropping on to the surface 28, move down across the surface 28 and down across the guard 32 to drop off the guard into the chip pan 13.

Thus when a workpiece is supported between spindles 3 and 5 and is being cut as by the tool T, the chips formed will fly away and drop on one or more of the inclined surfaces 31, 28 or 32 and gravity will cause the same to move down toward the back. Coolant (when used for cutting) will fall on one or more of these surfaces and move downwardly. Coolant will enhance the migration of chips toward the back.

The chip pan 13 connected to the back 21 is disposed under the chip guard 32 and will collect the chips and coolant flowing down from the guard. Drains 39 in the chip pan are used to take off the coolant. The chips can be collected from the pan at desired intervals. It will be understood that the chip pan can be in the form of automatic equipment, for example, a conveyor running along the back just under the chip guard 32.

It will be observed that the edge 33 of the chip guard 31 is spaced from the point 34 on the surface 28 and that the edge 35 of the chip guard 32 is spaced from the point 36 on the top of the back. These spaces make the slide discontinuous and, in effect, form a pair of slots 37 and 38 which extend throughout the length of the section 15 of the bed. Also, it is pointed out that the chip guards 31 and 32 can be of a lateral width so that the edge 33 makes a substantial overhang with the surface 28 and the edge 35 makes a substantial overhang with respect to the top 24 of the back.

Another feature of the invention is the manner in which the slide means isolates the bed ways from the chips and coolant. This is described following.

In reference to FIGURE 6, it will be seen that the top 24 of the back has a shoulder which supports a bearing way 40 which extends throughout the full length of the section 15 of the bed. The way 40 has a bearing surface 41 which is oriented horizontally. It will be observed that chip guard 32 is disposed over the way 40 and thus forms a protective cover (against chips and coolant) for the same.

The bridge 27 carries a V-shaped intermediate way 42 (at a higher elevation than way 40) which extends throughout the length of the section 15 of the bed. The way 42 has a guiding and bearing surface 43 which is oriented at an angle of 45° to the vertical. The way also has a guiding and bearing surface 44 which extends vertically or at 90° to the surface 41 of the way 40. The way 42 constitutes a single guide way which guides the carriage along the rotational axis of a workpiece supported on the spindle. The chip guard 31 extends over and covers the intermediate way 42 and isolates the same from chips and coolant.

The top of the front carries a way 45 (at a higher elevation than way 42) which extends along the length of the section 15 of the bed. This way has a bearing surface 46 which is substantially flush with the top of the chip guard 31. Both the surface 46 and the guard 31 are oriented at an acute angle of 55° to the vertical. The bearing surface 46 forms its own protection against chips and coolant; i.e., the slanting orientation causes chips or coolant to move down off the surface toward the chip guard 31.

In connection with the bearing ways 40 and 42 and the chip guards 31 and 32, it is pointed out that the lateral width of the guards and the location of the ways are chosen so that the guards overhang the ways to a degree necessary for desired protection.

The disposition and orientation of the bearing ways 40, 42 and 45 form an important feature of the invention in that the ways support the weight of the carriage and absorb thrust developed during the cutting operation in a manner so that the movement of the carriage is controlled by a single guideway. The single guideway insures maximum precision alignment and is conducive to the maintenance of original accuracy over long periods of time.

The general structure of the carriage and the manner in which it engages the ways will be described following.

The carriage 10 has an elongated body 48 which extends transverse to the axis of the bed and at the lower section 49 has means forming a bearing surface 50 which mates with the bearing surface 41. The center section 51 of the body has means forming a bearing and guide surface 52 which mates with the bearing and guiding surface 43. The section 51 of the carriage also has means forming a bearing and guide surface 53 which mates with the bearing and guide surface 44 on the intermediate way 42. Adjacent its top, the carriage has a wear plate 54, whose surface 55 mates with the bearing surface 46. The carriage is maintained in proper engagement with the above mentioned surfaces as by the clamps 56 and 57. The bearing surface 46 is oriented to absorb some carriage weight but for the most part to absorb forces developed during a cutting operation. The bearing surface 41, in the main, absorbs forces due to carriage weight. The surfaces 43 and 44 on the guide way 42, however, absorb the greater part of the weight and cutting forces involved. As between the surfaces 43 and 44 the arrangement provides that a lesser amount of force is imposed on the surface 44 than is imposed on the surface 43. This force distribution is important from the standpoint of maintaining alignment, because wear on the slant surface 43 has a much less effect on alignment than wear on surface 44.

In connection with the above described structure it will be noted that the lower section 49 of the carriage projects into the lower slot 38 and the intermediate section 51 of the carriage projects into the slot 37. Thus, these vertically oriented slots, although formed in the bed slide, serve the functional purpose of providing an access for the carriage to the bearing ways 40 and 42.

It will be noted that the carriage is constructed so that it can move back and forth over the bed without interfering with the functioning of the chip guards 31 and 32. This is brought about by the fact that the main body of the carriage in conjunction with the sections 49 and 51 form slots 60 and 61 respectively accommodating the chip guards.

One of the most important features of the invention is the location of the carriage feed mechanism (feed screw and nut). The location provides for the feed mechanism to apply its driving force so as to move the carriage along the bed without cocking or fishtailing and the location also provides for isolating the feed mechanism from chips and coolant for all positions of the carriage along the bed. This is described below.

With the above described design, the resultant force due to weight and cutting operates in the area between the intermediate way 42 and the upper way 45. This resultant force is indicated in FIGURE 6 by the vector V. In general, the resultant force is oriented normally to the surface 46 on the upper way and is located between the intermediate way 42 and the upper way 45 depending generally on the type of cutting operation, material involved and radial tool position. The carriage feed screw 64 and nut 65 are located approximately mid-way between the intermediate way 42 and the upper way 45 so that the driving thrust between feed screw and nut is applied substantially in line with the resultant force. Also the distance between the guide way 42 and the nut and screw is held to a minimum. The foregoing has the desirable effect of eliminating or reducing unwanted moment arms. Thus cocking or fishtailing forces are eliminated or reduced to a negligible minimum.

Figure 4:
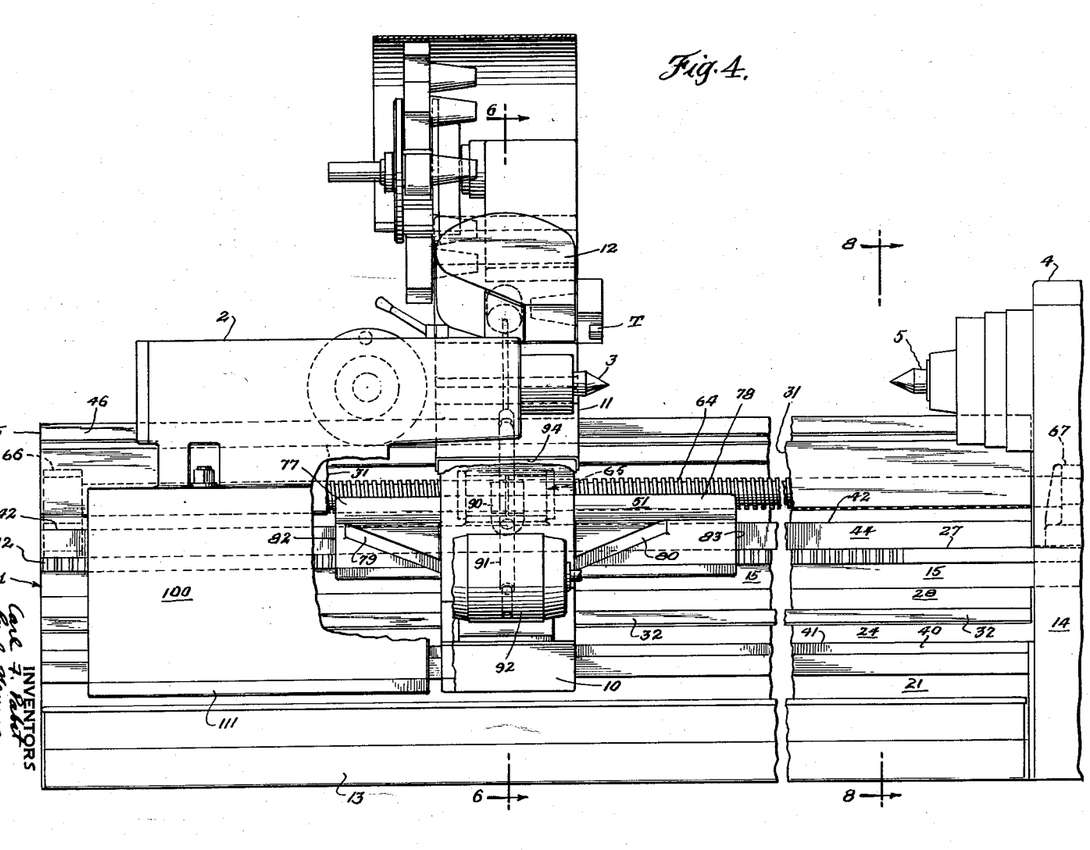
FIGURE 4 is an elevational view of the back of the lathe of FIGURE 1 but with the carriage up adjacent the tailstock, the view is taken in a direction indicated by the arrow *b* in FIGURE 1 and shows certain of the carriage guiding structure.

As best seen in FIGURE 4, the feed screw 64 extends through the length of section 15 of the bed and is rotatably mounted by the bearing support 66 and by the bearing support 67. With reference to FIGURE 6, it will be seen that the screw 64 is disposed underneath the chip guard 31 and this is isolated and protected from chips and coolant. The nut 65 (see FIG. 7) is comprised of a pair of members 70 and 71 having flanges 72 and 73 which are respectively fixed in the undercuts 74 and 75 in a lug 76 fixed to section 51 of the carriage. The flanges being engaged with the undercuts prevent the members 70 and 71 from turning. Incidentally, it will be observed that the top portion of the lug 76 forms part of the slot 60. The nut 65 is disposed underneath the chip guard 31 and thus is isolated from chips and coolant.

The nut members 70 and 71 are arranged to tightly engage and operate on different sides of the screw thread so as to eliminate back lash. The structure for accomplishing this is conventional and is not shown or described in detail.

As mentioned heretofore, one of the features of the invention is that the carriage is guided by a single guide way and in this connection the invention contemplates that the portion of the carriage in contact with the guide way extend over a considerable axial length so as to provide substantial lateral stability. This is described below.

With reference to FIGURE 4, the section 51 of the carriage has two wings which extend outwardly as indicated at 77 and 78. These wings are backed up by the braces 79 and 80.

The guide and bearing surfaces 52 and 53 (FIG. 6) on the carriage are formed both on the section 51 and its wings 77 and 78 and extend from the end 82 of the wing 77 to the end 83 of the wing 78. This long contact (axial) with the surfaces 43 and 44 on the guide way 42 gives considerable lateral stability to the carriage.

The carriage 10 supports the cross slide 11 in a guide way (see FIG. 7) which comprises the dovetail means generally indicated at 85. The dovetail means or guide way extends at an acute angle of 55° to the vertical (or 35° to the horizontal) and has the same orientation as the surface 55 on the upper way 45. The guide way is of a length to provide for the desired radial movement of slide 11 and tool T. The cross slide 11 is powered by conventional means such as the nut 90 (FIGURE 6) fixed on the slide and the feed screw 91 rotatably mounted on the carriage. The feed screw 91 is rotated as by the motor 92 and control mechanism in the housing 93.

The cross slide is provided with telescoping cover 94 so as to prevent chips from reaching the guide way 85 and the lead screw 91. The carriage mounts the cross slide resolver 95 and the carriage resolver 96. The motor 92 and resolvers 95 and 96 are part of the automatic control mechanism which is not shown or described.

With reference to FIGURE 9, the tailstock mechanism 2 is mounted on a frame 100 which has a slot 101 to accommodate the chip guard 31 and a slot 102 to accommodate the chip guard 32. The portion 103 of the frame 100 projects into the slot 37 and has a surface 104 mating with the bearing surface 43 on the intermediate way 42. The section 105 of the frame 100 projects into the slot 38 and has a surface 106 which mates with the surface 41 on the lower way 40. These bearing surfaces support the weight of the tailstock and the tailstock is held thereon as by the clamps 110 and 111. The tailstock is slidable along the bed to accommodate work pieces of varying length. The tailstock is adapted to be held in a desired position by a pawl mechanism (not shown) which engages with the tailstock holding rack 112. The surface 109 mates with the guideway 44 and guides the movement of the tailstock over the bed. On the inside of the tailstock are conventional means for rotatably mounting the spindle 3.

With reference to FIGURE 8, the headstock 4 is mounted on the bed as by the pad 113 on the bed section 14 and by the lug 115 engaging the shoulder 116 on the top of the front. The end piece 120 of the headstock is cut away as at 121 to accommodate the bridge 27 and the feed screw 64. In back of the cutaway 121, the headstock is configured (dotted line 122) to provide a space for the bridge 27, feed screw 64, bearing support 67 and the mechanism for rotating the feed screw. On the inside of the headstock are various conventional shafts, bearings, gears, etc. for mounting and rotating the chuck or spindle 5 and for rotating the feed screw.

With reference to FIGURES 5 and 8, it will be observed that a vertical plane containing the rotational axes of the tailstock and headstock is located (in plan) between the lower way 40 and the intermediate way 42.

We claim:
1. In a lathe:
an elongated, horizontally extending bed having a front and a back with the front being higher in vertical elevation than the back;
an upper way connected adjacent to the top part of said front and extending along the axis of the bed, the way having a bearing surface and the bearing surface extending at an acute angle to the vertical;
a lower way connected to said back and extending along the axis of the bed, the way having a horizontally extending bearing surface, the upper way being at a higher vertical elevation than the lower way and the two ways, in plan, being spaced apart;
an intermediate way connected to and extending along an axis of the bed and the intermediate way, both in elevation and in plan, being disposed between said upper and lower ways, the intermediate way having a pair of guiding and bearing surfaces one of which is vertically oriented and the other oriented at an acute angle to the vertical and the vertical surface facing the back of the lathe and the other surface facing the front of the lathe;
a feed screw rotatably mounted on and extending along the axis of the bed, the screw, both in elevation and in plan, being disposed between said upper way and said intermediate way;
a carriage disposed over and extending transversely to the axis of the bed;
mechanism on the carriage comprising bearing surfaces respectively engaging the bearing surfaces on said upper and lower ways and also engaging the guiding and bearing surfaces on said intermediate way;
nut means on said carriage engaging said feed screw and causing motion of the carriage along the axis of the bed with rotation of the screw; and means on said carriage comprising a cross slide guideway, the guideway extending transverse to the axis of the bed and being oriented at an acute angle to the vertical.

2. A construction in accordance with claim 1 wherein the bearing surface on the upper way is oriented at an acute angle of 55° with the vertical, and said other surface on said intermediate way is oriented at an acute angle of 45° to the vertical and said cross slide guideway is oriented at an acute angle of 55° to the vertical.

3. A construction in accordance with claim 1 wherein said mechanism has wings which extend on opposite sides of said carriage respectively in directions towards opposite ends of said bed and have means engaging the guiding and bearing sufaces on the intermediate way to make substantially long contact between the carriage and the intermediate way to provide lateral stability to said carriage.

4. A construction in accordance with claim 1 further including a headstock mounted on one end of said bed and a tailstock movably mounted on said bed, the headstock and the tailstock each having rotatable spindles, the axes of which are co-axial and, in plan, said axes being disposed between said intermediate and said lower way.

5. A construction in accordance with claim 4 wherein said tailstock has means comprising bearing surfaces respectively engaging the bearing surfaces on said intermediate way and lower ways.

6. In a lathe:
an elongated, horizontally extending bed having a front and a back with the front being higher in vertical elevation than the back;
an upper way connected adjacent to the top part of said front and extending along the axis of the bed, the way having a bearing surface;
a lower way connected to said back and extending along the axis of the bed, the way having a bearing surface, the upper way being at a higher vertical elevation than the lower way and the two ways, in plan, being spaced apart;
an intermediate way connected to and extending along the axis of the bed and the intermediate way, both in elevation and in plan, being disposed between said upper and lower ways, the intermediate way having a pair of guiding and bearing surfaces, one of which is vertically oriented and the other oriented at an acute angle to the vertical and the vertical surface facing the back of the lathe and the other surface facing the front of the lathe;
a feed screw rotatably mounted on and extending along the axis of the bed, the screw, both in elevation and in plan, being disposed between said upper way and said intermediate way;
a carriage disposed over and extending transversely to the axis of the bed;
mechanism on the carriage comprising bearing surfaces respectively engaging the bearing surfaces on said upper and lower ways and also engaging the guiding and bearing surfaces on said intermediate way;
nut means on said carriage engaging said feed screw and causing motion of the carriage along the axis of the bed with rotation of the screw; and
means on said carriage comprising a cross slide guideway, the guideway extending transverse to the axis of the bed and being oriented at an acute angle to the vertical.

7. In a lathe:
an elongated, horizontally extending bed including a headstock having means for rotatably mounting a workpiece to be machined;
a first way connected adjacent to one side of and extending along the axis of the bed, the way having a bearing surface;
a second way connected to and extending along the axis of the bed and the second way, in plan and in elevation, being spaced from said first way and the second way having a pair of guiding and bearing surfaces, one of which is vertically oriented and the other oriented at an acute angle to the vertical;
a feed screw rotatably mounted on and extending along the axis of the bed, the screw, both in elevation and in plan, being disposed between said first way and said second way;
a carriage disposed over and extending transversely to the axis of the bed;
mechanism on the carriage comprising a first bearing surface engaging the bearing surface on said first way and also second and third bearing surfaces respectively engaging said acute and vertical surfaces on said second way;
nut means on said carriage engaging said feed screw for causing motion of the carriage along the axis of the bed with rotation of the screw;
means on said carriage comprising a cross slide guideway, the guideway extending transverse to the axis of the bed and being oriented at an acute angle to the vertical; and
a cross slide on said guideway, the cross slide having a support for holding a cutting tool and the second way being oriented to provide for cutting force developed during machining to move the carriage in a direction to effect engagement of said third surface and said vertical surface.

8. In a lathe:
an elongated, horizontally extending bed including a headstock having means for rotatably mounting a workpiece to be machined;
a first way connected adjacent to one side and extending along the axis of the bed, the way having a bearing surface;
a second way connected to and extending along the axis of the bed and the second way, in plan and in elevation, being spaced from said first way and the second way having a pair of guiding and bearing surfaces, one of which is vertically oriented and the other oriented at an acute angle to the vertical;
a feed screw rotatably mounted on and extending along the axis of the bed, the screw, both in elevation and in plan, being disposed between said first way and said second way;
a carriage disposed over and extending transversely to the axis of the bed;
mechanism on the carriage comprising a first bearing surface engaging the bearing surface on said first way and also second and third bearing surfaces respectively engaging said acute and vertical surfaces on said second way, the mechanism having wings which extend on opposite sides of said carriage respectively in directions towards opposite ends of said bed and having means engaging the acute and vertical surfaces on the second way to make substantially long contact between the carriage and the second way to provide lateral stability to said carriage;
nut means on said carriage engaging said feed screw for causing motion of the carriage along the axis of the bed with rotation of the screw;
means on said carriage comprising a cross slide guideway, the guideway extending transverse to the axis of the bed and being oriented at an acute angle to the vertical; and
a cross slide on said guideway, the cross slide having a support for holding a cutting tool and the second way being oriented to provide for cutting force developed during machining to move the carriage in a direction to effect engagement of said third surface and said vertical surface.

9. In a lathe:
an elongated, horizontally extending bed;
a first way connected adjacent to one side of and extending along the axis of the bed, the way having a bearing surface;
a second way connected to and extending along the axis of the bed and the second way, in plan, being spaced from said first way and, in elevation, being lower than said first way, the second way having a pair of guiding and bearing surfaces, one of which is vertically oriented and the other oriented at an acute angle to the vertical;
a feed screw rotatably mounted on and extending along the axis of the bed, the screw, both in elevation and in plan, being disposed between said first way and said second way, said acute angle surface facing the feed screw;
a carriage disposed over and extending transversely to the axis of the bed;
mechanism on the carriage comprising bearing surfaces respectively engaging the bearing surface on said first way and also engaging the guiding and bearing surfaces on said second way;
nut means on said carriage engaging said feed screw for causing motion of the carriage along the axis of the bed with rotation of the screw; and
means on said carriage comprising a cross slide guideway, the guideway extending transverse to the axis of the bed and being oriented at an acute angle to the vertical.

10. In a lathe:
an elongated, horizontally extending bed;
a first way connected adjacent to one side of and extending along the axis of the bed, the way having a bearing surface;
a second way connected to and extending along the axis of the bed and the second way, in plan, being spaced from said first way and, in elevation, being lower than said first way, the second way having a pair of guiding and bearing surfaces, one of which is vertically oriented and the other oriented at an acute angle to the vertical;
a feed screw rotatably mounted on and extending along the axis of the bed, the screw, both in elevation and in plan, being disposed between said first way and said second way, said acute angle surface facing the feed screw;
a carriage disposed over and extending transversely to the axis of the bed;
mechanism on the carriage comprising bearing surfaces respectively engaging the bearing surface on said first way and also engaging the guiding and bearing surfaces on said second way, the mechanism having wings which extend on opposite sides of said carriage respectively in directions towards opposite ends of said bed and having means engaging the guiding and bearing surfaces on the second way to make substantially long contact between the carriage and the second way to provide lateral stability to said carriage;
nut means on said carriage engaging said feed screw for causing motion of the carriage along the axis of the bed with rotation of the screw; and
means on said carriage comprising a cross slide guideway, the guideway extending transverse to the axis of the bed and being oriented at an acute angle to the vertical.

References Cited by the Examiner

UNITED STATES PATENTS 2,546,687  3/51  Brandenburg _________ 82—32 X

FOREIGN PATENTS 644,182  4/37  Germany.
853,606  11/60  Great Britain.

WILLIAM W. DYER, Jr., *Primary Examiner.*